United States Patent Office 3,503,797
Patented Mar. 31, 1970

3,503,797
INSULATING METHOD FOR ELECTRICAL MACHINERY AND APPARATUS
Hiroshi Hagiwara, Osaka, Teijiro Murakami, Kawanishi-shi, and Koichi Hirakawa, Toyonaka-shi, Japan, assignors to Matsushita Electric Industrial Co., Ltd., Osaka, Japan, a corporation of Japan
Filed Sept. 20, 1966, Ser. No. 580,788
Claims priority, application Japan, Sept. 27, 1965, 40/59,249; Nov. 19, 1966, 41/2,925; May 12, 1966, 41/31,045
Int. Cl. B44d 1/44
U.S. Cl. 117—215                                      5 Claims

ABSTRACT OF THE DISCLOSURE

A method of electrically insulating a member involving the formation thereon of a porous layer of insulating material and the subsequent impregnation of same with an impregnating insulating material.

---

This invention relates to a method of insulating machinery and apparatus which require to be electrically insulted, by forming a good insulation layer thereon which does not include any void within the layer, at a reduction in cost and labor.

Recently, there is tendency that electric machinery and apparatus are manufactured small in size and light in weight. Electric machinery and apparatus operated at low voltage are reduced in size by virtue of improvements in insulation papers and development of insulation coatings. However, the insulation of electric machinery and apparatus operated at a high voltage still relies on liquid insulators. When using a liquid insulator, a case for containing the liquid insulator is needed, and some parts of the machinery which do not essentially require to be insulated, must also be insulated, thus making it difficult to manufacture machinery and apparatus in reduced size. The object of this invention is to aid the manufacture of electric machinery and apparatus small in size and light in weight by using a liquid insulator or a synthetic resin in combination with a porous insulator.

Hereinafter, an embodiment of this invention will be explained, as applied to an electromagnetic coil and an electromagnetic iron core. Firstly, the method of insulating an electromagnetic coil will be explained. In the past, main insulators for the electromagnetic coil of a dry type transformer, for example, are formed by molding or casting a synthetic resin. Since, in the molding or casting method, a mold is needed to make electromagnetic coils of a predetermined shape, a remarkable initial expense is needed, (especially in the molding method). Further, it is not easy to obtain uniform and voidless insulation layers by either the molding method or the casting method. Thus, the molding method and casting method have the deficiency that a uniform insulation characteristic cannot be obtained.

On the other hand, an electromagnetic coil of an oil immersed transformer is provided with predetermined insulation, and then is assembled with an electromagnetic iron core. The assembly is then mounted within a case which is filled with an insulation oil to obtain the desired insulation of the assembly. According to this system, the transformer is large in dimension and is heavy in weight, and further, there are occasions when the electric insulation characteristic of the transformer is remarkably deteriorated by dispersion of iron particles in oil, since iron particles are produced when the iron core is vibrated during the practical use of the transformer and therefore disperse into the oil surrounding the coils and iron core of the transformer. In such cases the oil must be exhausted from the case and filtered to eliminate such particles to thereby reestablish the insulation characteristic. The filtered oil may then be poured in the case, or new oil may be poured in the case. This operation takes a great dael of time and is very expensive.

This invention relates to a method of insulating whereby the problems confronted in the prior arts are solved, and will be explained hereinunder with reference to the drawings, wherein.

Figure 1:
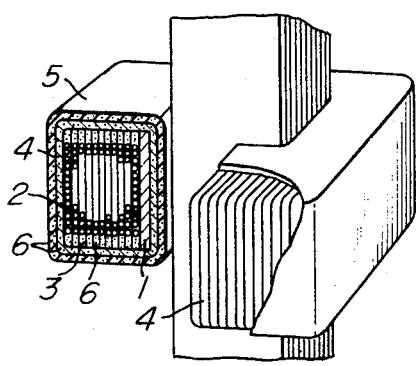
FIG. 1 is a perspective view, partly broken away, of an electromagnetic coil, insulated according to the method of this invention.

Referring to FIG. 1 reference numeral 1 denotes a coil bobbin made of an insulation material, such as a lamination of phenol resin, or vulcanized fiber or press board or the like, having sufficient mechanical strength so that it is not deformed by the winding work of a magnet wire of an electromagnetic coil 2 there around. Reference numeral 3 denotes layer insulators, inserted between each layer of the coil 2 having a sufficient dielectric strength for the voltage across the adjacent layers of the coil 2 to prevent short-circuiting between adjacent layers of the coil 2. Reference numeral 4 denotes a tape-form fibrous insulator which is wound spirally around the assembly of the coil bobbin 1, and the layer insulators 3 and the coil 2. This insulator 4 must have a layer tensile strength and a large degree of elongation, besides a superior electric insulation characteristic, since it is wound around the coil assembly under tension. In case a specially large tensile strength is required, the tape-form insulator 4 is formed with two sheets which are bound to each other by a binder with cotton or nylon threads positioned thereinbetween in a suitably spaced relation. The thickness and the number of laminations of the tape-form insulator 4 are determined by the voltage required for the electromagnetic coil. In case the voltage required for the electromagnetic coil is low, there is no need to use the fibrous insulator. Reference numeral 5 denotes a porous insulating coating. This coating has such pores that an impregnation material can easily be impregnated inside of the coil when a vacuum impregnating operation for the porous insulation coating is performed.

An example of the porous insulating coating is described hereinafter.

Semi-cure phenol resin, soluble by a solvent, pulverized to below the particle size of $150\mu$, is mixed, by 10 to 20% in weight, with powders of $CaCO_3$ of particle size below $150\mu$. A mixed solvent of acetone and methanol is poured on the above-described mixture. Phenol resin is dissolved in the mixed solvent, and $CaCO_3$ is dispersed in the mixed solvent, whereby the mixed solvent being a suspension with $CaCO_3$. The electromagnetic coil, wound with the fibrous insulator, is dipped in this suspension, and is then removed, dried and heat-treated, thereby the coil assembly is coated with a porous insultion coating 5. To improve the surface corona resistance property of the porous insulation coating 5, powdered $Al_2O_3$ of particle size below $150\mu$, together with epoxy resin can be used as a binder. Various porous insulation coatings can be obtained by using a filling material of different particle size, or of different kind, or using a different kind of binder. As an impregnation material 6, a liquid insulator or a thermoplastic resin, such as polyethylene, polypropylene and micro crystal wax, thermosetting resin, and so on, may be used.

In an electromagnetic coil, which is used at a high voltage, and therefore, the corona resistance property thereof is to be taken into consideration, it is preferable to use an insulation oil such as mineral oil or polybutane oil, which has a large dielectric strength. By using such oil, very few voids are generated in the coil. In an electromagnetic coil, which is required to have a high thermal stability property, it is preferable to use an epoxy resin with an acid anhydrate as a curing agent.

An electromagnetic coil wound spirally therearound with a fibrous insulator of 0.15 mm. thickness, crimped with wrinkles, coated with a porous insulator of from 0.5 to 1 mm. thickness of $CaCO_3$ with phenol resin as a binder, and impregnated with polybutane oil at about 140° C. to 150° C. by vacuum impregnation through the porous insulation coating, has a high corona discharge voltage which is more than twice that of a conventional coil.

An uniform, voidless coating can be obtained easily, by forming a porous insulation coating on an electromagnetic coil, and impregnating the coating with a synthetic resin, without the necessity of a molding machine and a mold. Therefore, according to this invention, the electric insulation property and life of electric machinery and apparatus are improved, and the installation cost can be diminished compared with the conventional molding- or casting-method.

An electromagnetic coil, according to this invention, wherein a liquid insulator is used as an impregnation material, has a similar dielectric strength and corona resistance property with a conventional oil immersed type transformed coil.

Figure 2:
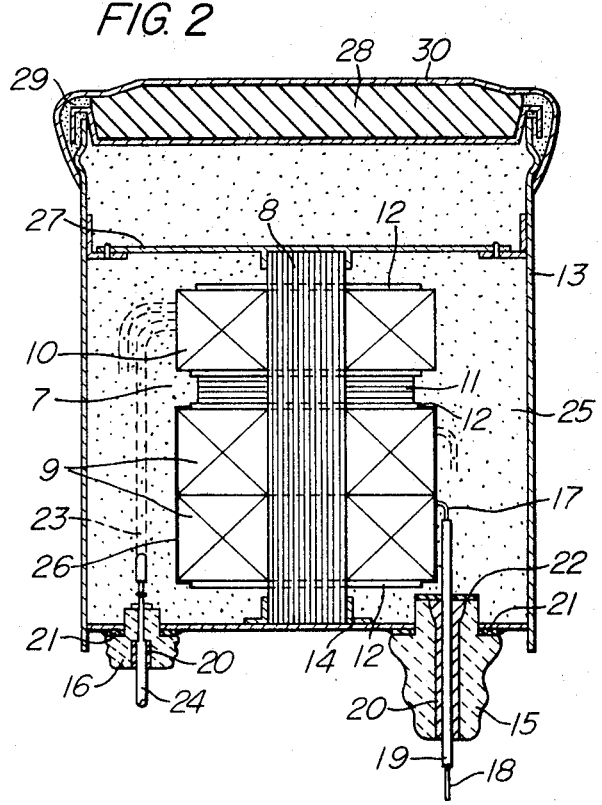
FIG. 2 is a sectional view of a transformer with insulated coil according to the method of this invention.

Referring to FIG. 2, reference numeral 7 denotes a main body of a transformer comprising an electromagnetic core, of 8 iron clad type, around which two high voltage coils 9, 9 which are insulated according to the method of this invention, and a low voltage coil 10 are wound. Reference numeral 11 denotes a shunt core inserted between the high voltage coils 9, 9 and the low voltage coil 10 for adjusting load current, and reference numeral 12 denotes press boards inserted as spacers between the iron core 8 and the coils 9, 9 and 10 and between the shunt core 11 and the coils 9, 9 and 10 to secure fixedly the coils 9, 9 and 10 and the shunt core 11 to the main core 8. Reference numeral 13 denotes a cylindrical case having a bottom plate; reference numeral 14 denotes a brace to fix the iron core 8 to the bottom plate of the case 13; reference numerals 15 and 16 denote insulators respectively, both fixed to the bottom plate and penetrating therethrough from the underside of the bottom plate. Reference numeral 17 denotes a terminal of the high voltage coil 9, reference numeral 18 denotes a lead wire connected to the terminal 17; reference numeral 19 denotes an insulator covering a part of the lead wire 18. The lead wire 18 is led out through the insulator 15, and the space between the insulator 19 and the insulator 15 is filled with a resin 20 poured therein, and the insulator 19 and the porcelain insulator 15 are bound together by the resin 20. Reference numeral 21 denotes a rubber packing inserted between the bottom of the case 13 and the insulator 15. A rubber packing 22 is provided on the insulator 15. On the other hand, a lead wire 23 of the low voltage coil 10 is connected to a terminal 24 and is led out through the insulator 16. Reference numeral 25 denotes an insulator such as microcystalline wax, pitch compound and asphalt. The insulator 25 is filled in the case, in a liquid-like state by heating to a high temperature and thus fully covers the coils 9 and 10 and the iron core 8 infiltrating the fine gaps thereof. Therefore, no gaps nor voids exist within the case, and there is substantially no corona discharge. Further no voids nor cracks are generated in this insulator 25 by a sudden change in the temperature, and the invasion of water can be prohibited by this insulator. Reference numeral 26 denotes a layer of liquid insulator between the surfaces of the coils 9, 9 and the insulator 25, the liquid insulator also being impregnated in the coils 9, 9. Reference numeral 27 is a brace plate to fix the iron core 8 within the case 13 holding the upper part of the iron core 8 fixedly. Reference numeral 28 denotes a rubber packing, bound to the case 13 and being enclosed by the resin 29, is provided to prevent invasion of moisture from the outside, and to prevent the outflow of the insulator 25. A cover 30 is mounted on the packing 28 and is bound to the packing 28 and to the case 13 by the resin 29, and the end parts thereof are clamped to the outer side of the case 13 mechanically.

The case 13 is completely enclosed in the manner as described above.

Accordingly, by using a coil which is insulated according to the insulation method described above, and further, by forming a liquid thin layer between the coils and the solid insulator surrounding the coils, the electric characteristics of a transformer are improved remarkably compared with a conventional transformer.

According to this invention, an electric machinery can be also remarkably improved in size and in weight. Thus the method of this invention has remarkable practical merits compared with a conventional insulating method for either dry type or oil immersed type machinery and apparatus.

A method of insulating an electromagnet iron core will be explained hereinafter. By a conventional insulation system of an electromagnet iron core, such as a stator core of an electric motor, a press board or a press board adhered with a polyester film is inserted in a slot along the inner wall of the slot whereby conductors are insulated from the iron core. Another method, which has recently come to light, is a powder coating method for insulating an electromagnet iron core. According to this method, as publicly known, an insulation film is formed on an electromagnetic iron core by inversion in an impregnating tank or by a spray gun. The former method requires much labour. Further, by this method, the insulation of a magnet wire might be broken, because the magnet wire is caused to contact the rough edge of the iron core during the winding operation of the magnet wire, and might cause a layer short-circuiting of the electromagnetic coil. By the latter method, although the above-described deficiency is eliminated, the installation cost is high, and an expensive synthetic resin powder is required.

According to this invention, the above-described defiiciencies are eliminated.

The method of this invention applied to the insulation of an iron core will be explained hereinafter with reference to FIG. 3.

Figure 3:
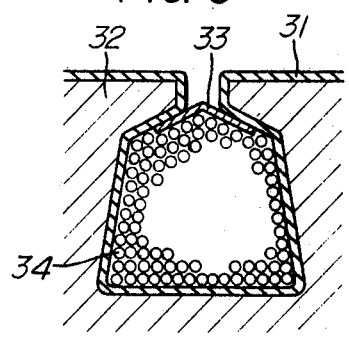
FIG. 3 is a sectional view of an iron core for electromagnetic machinery and apparatus insulated according to the method of this invention.

Referring to FIG. 3, reference numeral 31 denotes an insulation coating; reference numeral 32 denotes an electromagnetic iron core; 33 denotes a wedge; and reference numeral 34 denotes a coil. The insulation coating 31 is a porous insulation coating wherein a thermoplastic resin or a thermosetting resin is used as the impregnation material.

Although the edges of the iron core 32 are rough, the porous insulation coating according to this invention can be formed on the rough edges easily with sufficient strength, and the porous insulator covers the rough edges of the iron core and thus smooths the rough edges.

Thus, according to the method of this invention, the amount of work is diminished compared with a conventional method, and there is no chance that the insulation of a magnet wire is broken by contacting the rough edges of the iron core.

Further, the expensive apparatus and the expensive powder of synthetic resin, which is required for a powder coating method, are not needed according to the method of this invention.

In the above, methods for insulating separately an electromagnetic coil or an electromagnetic iron core has been explained. The similar effect can be obtained when both the electromagnetic coil and the electromagnetic iron core, after they have been assembled, are treated for insulation according to the method of this invention.

Although the explanation of this invention described above is made relating to a transformer and a motor, the method of this invention can be applied with similar effect to other electric machinery comprising a conductor and an insulator.

What we claim is:

1. A method of insulating an electrical member comprising the steps of: depositing on the member, powder of $CaCO_3$ or $Al_2O_3$ dispersed in a solution which is prepared by dissolving semi-solid phenol resin or epoxy resin in acetone or a mixed solvent of acetone and methanol, the quantity of the phenol or epoxy resin being 10 to 20% by weight of the total quantity of the resin-powder mixture, drying the deposited coating to form a porous insulating layer having interconnecting pores, and then impregnating said layer with an impregnating liquid selected from the group consisting of mineral oil, polybutane oil, polyethylene, polypropane, and micro-crystal wax.

2. The method of claim 1 wherein said powder is $CaCO_3$, and said solution contains phenol resin alone.

3. An insulating method as defined in claim 1, wherein the impregnation is effected by vacuum impregnation.

4. An insulating method as defined in claim 1, which further includes a preliminary step of winding a fibrous insulation tape around the electrical member onto which tape the dispersed powder is then deposited, and said impregnating liquid is applied to impregnate said tape as well as said porous layer.

5. An insulating method as defined in claim 4, wherein the impregnation is effected by vacuum impregnation.

References Cited

UNITED STATES PATENTS

| | | | |
|---|---|---|---|
| 2,795,009 | 6/1957 | Gosnell et al. | 264—272 X |
| 2,930,011 | 3/1960 | Wigert et al. | 336—96 |
| 3,031,344 | 4/1962 | Sher et al. | |
| 3,161,843 | 12/1964 | Hodges et al. | 264—272 X |
| 3,233,311 | 2/1966 | Giegerich et al. | 264—272 X |
| 3,288,747 | 11/1966 | Sussman. | |
| 2,459,018 | 1/1949 | De Monte et al. | 117—218 |
| 3,071,496 | 1/1963 | Fromm et al. | 117—119 X |
| 3,253,952 | 5/1966 | Merry et al. | 117—119 X |

FOREIGN PATENTS 156,607    12/1951    Australia.

ALFRED L. LEAVITT, Primary Examiner

C. K. WEIFFENBACH, Assistant Examiner

U.S. Cl. X.R.

117—119, 218, 232